(12) United States Patent
Wentink (10) Patent No.: US 9,839,008 B2
(45) Date of Patent: Dec. 5, 2017

(54) AVOIDING EXTENDED INTERFRAME SPACE

(71) Applicant: QUALCOMM Incorporated, San Diego, CA (US)

(72) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 14/622,580

(22) Filed: Feb. 13, 2015

(65) Prior Publication Data

US 2015/0245319 A1     Aug. 27, 2015

Related U.S. Application Data

(60) Provisional application No. 61/943,821, filed on Feb. 24, 2014.

(51) Int. Cl.
*H04W 4/00*     (2009.01)
*H04W 72/04*   (2009.01)
(Continued)

(52) U.S. Cl.
CPC ........... *H04W 72/04* (2013.01); *H04L 5/0055* (2013.01); *H04W 74/08* (2013.01); *H04W 74/0833* (2013.01); *H04W 84/12* (2013.01)

(58) Field of Classification Search
CPC .................................................. H04W 72/04
(Continued)

(56) References Cited

U.S. PATENT DOCUMENTS 8,730,960 B2     5/2014  Hart et al.
2005/0135284 A1*  6/2005  Nanda ............... H04L 29/06068
                                                    370/294
(Continued)

OTHER PUBLICATIONS

IEEE Computer Society, "IEEE Standard for Information technology—Telecommunications and information exchange between systems—Local and metropolitan area networks—Specific Requirements, Part 11: Wireless LAN Medium Access Control (MAC) and Physical Layer (PHY) Specifications, Amendment 5: Enhancements for Higher Throughput," IEEE Std 802.11n™-2009 (Amendment to IEEE Std 802.11™-2007, as amended by IEEE Std 802.11k™-2008, IEEE Std 802.11r™-2008, IEEE Std 802.11y™-2008, and IEEE Std 802.11w™-2009), Oct. 29, 2009, 536 pgs., Institute of Electrical and Electronics Engineers, New York, NY.
(Continued)

*Primary Examiner* — Christopher R Crompton
(74) *Attorney, Agent, or Firm* — Holland & Hart LLP/Qualcomm (57) ABSTRACT

Methods, systems, and devices are described for avoiding extended interframe space (EIFS) in a wireless local area network (WLAN). A wireless device may transmit a message during a transmit opportunity (TXOP) that includes a first portion transmitted at a first data rate and a second portion transmitted at a second rate that is higher than the first. The wireless device may then transmit a terminating message at the first data rate. The wireless device may also receive a second message prior to transmitting the terminating message. The terminating message may be a clear-to-send message (CTS) or an acknowledgement (ACK) message. The first message may be an aggregate media access control packet data unit (A-MPDU) in which the first portion is a preamble and the second portion is an MPDU.

20 Claims, 9 Drawing Sheets

(51) Int. Cl.
*H04L 5/00* (2006.01)
*H04W 74/08* (2009.01)
*H04W 84/12* (2009.01)

(58) Field of Classification Search
USPC ......................................................... 370/329
See application file for complete search history.

(56) References Cited

U.S. PATENT DOCUMENTS

| | | | | |
|---|---|---|---|---|
| 2007/0116035 A1* | 5/2007 | Shao | ..................... | H04W 74/08 370/461 |
| 2007/0160040 A1* | 7/2007 | Kwon | ..................... | H04L 47/10 370/389 |
| 2008/0316981 A1* | 12/2008 | Trainin | ................. | H04L 5/1453 370/338 |
| 2010/0220601 A1* | 9/2010 | Vermani | ............... | H04L 1/0025 370/248 |
| 2011/0096685 A1* | 4/2011 | Lee, II | ................. | H04L 27/0012 370/252 |
| 2011/0222486 A1* | 9/2011 | Hart | ........................ | H04L 5/001 370/329 |
| 2012/0314636 A1 | 12/2012 | Liu | | |
| 2012/0327870 A1* | 12/2012 | Grandhi | ................ | H04W 28/06 370/329 |
| 2013/0128806 A1 | 5/2013 | Vermani et al. | | |
| 2014/0233524 A1 | 8/2014 | Jang et al. | | |
| 2014/0254424 A1 | 9/2014 | Gao et al. | | |
| 2016/0081010 A1* | 3/2016 | Seok | ................. | H04W 74/0816 370/329 |

OTHER PUBLICATIONS

ISA/EPO, International Search Report and Written Opinion of the International Searching Authority, Int'l Appl. No. PCT/US2015/017119, Jun. 2, 2015, European Patent Office, Rijswijk, NL, 10 pgs.

\* cited by examiner

AVOIDING EXTENDED INTERFRAME SPACE

CROSS REFERENCES

The present application for patent claims priority to U.S. Provisional Patent Application No. 61/943,821 by Wentink, entitled "Avoiding Extended Interframe Space," filed Feb. 24, 2014, assigned to the assignee hereof, and expressly incorporated by reference herein.

BACKGROUND

Field of the Disclosure

The following relates generally to wireless communication, and more specifically to avoiding extended interframe space (EIFS) in a wireless local area network.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power).

A wireless communications network may include a number of network devices such as access points (APs) that can support communication for a number of wireless devices. A wireless device may communicate with a network device bi-directionally. For example, in a wireless local area network (WLAN), a station (STA) may communicate with an associated AP via downlink and uplink. The downlink (or forward link) refers to the communication link from the AP to the station, and the uplink (or reverse link) refers to the communication link from the station to the AP.

In a WLAN, multiple stations may share wireless transmission resources using a contention based channel access procedure. In a contention based system, different stations may wait for different periods of time after the last successfully received frame before beginning to transmit. This time period may be known as a backoff counter. If a frame is received unsuccessfully, a station may wait for an additional time period, the EIFS, before continuing to decrement the backoff counter. The EIFS may allow another station time to send an acknowledgement (ACK) in response to the received frame if one is appropriate.

Whether or not a frame is received correctly depends on a number of factors including the rate at which the message is sent, and the distance between the sender and the receiver. Various stations may be located relative to each other in a manner such that some stations successfully receive a frame and other stations do not. If no ACK is sent, those stations that successfully receive the frame may begin the backoff immediately while those that receive a faulty frame check sequence (FCS) may wait for the EIFS. This may result in a biased access procedure.

SUMMARY

The described features generally relate to one or more improved systems, methods, and apparatuses for avoiding extended interframe space (EIFS) in a wireless local area network (WLAN). A wireless device may transmit a message during a transmit opportunity (TXOP) that includes a first portion transmitted at a first data rate and a second portion transmitted at a second rate that is higher than the first. The wireless device may then transmit a terminating message at the first data rate. The wireless device may receive a second message prior to transmitting the terminating message. As an example, the terminating message may be a clear-to-send message (CTS) or an acknowledgement (ACK) message. The first message may be an aggregate media access control packet data unit (A-MPDU) in which the first portion is a preamble and the second portion is an MPDU.

A method of wireless communication is described. The method includes transmitting a first message during a TXOP. The first message includes a first portion transmitted at a first data rate and a second portion transmitted at a second data rate that is higher than the first data rate. A terminating message is transmitted at the first data rate.

An apparatus is described for wireless communication. The apparatus includes means for transmitting a first message during a TXOP, wherein the first message comprises a first portion transmitted at a first data rate and a second portion transmitted at a second data rate that is higher than the first data rate; and means for transmitting a terminating message at the first data rate.

An apparatus for wireless communication is also described in which a transmitter is configured to transmit a first message during a TXOP, wherein the first message comprises a first portion transmitted at a first data rate and a second portion transmitted at a second data rate that is higher than the first data rate, and transmit a terminating message at the first data rate.

A non-transitory computer-readable medium is also described. The non-transitory computer-readable medium stores instructions executable by a processor to cause at least one device to: transmit a first message during a TXOP, wherein the first message comprises a first portion transmitted at a first data rate and a second portion transmitted at a second data rate that is higher than the first data rate; and transmit a terminating message at the first data rate.

A second message may be received prior to transmitting the terminating message. The second message may include a third portion transmitted at the first data rate and a fourth portion transmitted at a third data rate that is higher than the first data rate.

The terminating message may include a clear to send (CTS) message or an acknowledgement (ACK) message.

The first message may be transmitted at the beginning of the TXOP, a duration extending to the end of the terminating message may be indicated in a duration field of the first message.

The terminating message may be addressed to a transmitter of the terminating message, a latest recipient of the transmit opportunity, a group address, or a random address.

The first message may include an aggregate medium access layer protocol data unit (A-MPDU), the first portion includes a preamble of the A-MPDU, and the second portion includes a medium access layer protocol data unit (MPDU) of the A-MPDU.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to one or more improved systems, methods, and apparatuses for avoiding extended interframe space (EIFS) in a wireless local area network (WLAN). A wireless device may transmit a message during a transmit opportunity (TXOP) that includes a first portion transmitted at a first data rate and a second portion transmitted at a second rate that is higher than the first. The wireless device may then transmit a terminating message at the first data rate. The terminating message may also comprise a first portion and a second portion. The wireless device may receive a second message prior to transmitting the terminating message. As an example, the terminating message may be a clear-to-send message (CTS) or an acknowledgement (ACK) message. The first message may be an aggregated media access control packet data unit (A-MPDU) in which the first portion is a preamble and the second portion is an A-MPDU.

Because the terminating message (which may include a first and second portion) is sent at the first (lower) data rate, the range of stations that may be able to correctly receive the terminating message (including the second portion) may be increased. Accordingly, stations that are unable to receive and decode the second portion of the first message transmitted at the higher data rate may still be able to receive and decode the terminating message (including the second portion) sent at the lower data rate. Similarly, stations that are unable to receive and decode the second portion of the second message transmitted at the higher data rate may still be able to receive and decode the terminating message (including the second portion) sent at the lower data rate. Thus, some stations that would otherwise wait for an EIFS after failing to decode the entire first message may instead begin the backoff counter as soon as they receive the terminating message. This may result in an access procedure that is more impartial with respect to station location.

The techniques presented herein are generally described in connection with WLANs for simplicity. A WLAN (or Wi-Fi network) may refer to a network that is based at least in part on the protocols described in the various IEEE 802.11 standards (e.g., 802.11a/g, 802.11n, 802.11ac, 802.11ah, etc.). The same or similar techniques, however, may be used for various other wireless communications systems such as cellular wireless systems, peer-to-peer wireless communications, ad hoc networks, satellite communications systems, and other systems. The terms "system" and "network" may be used interchangeably.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
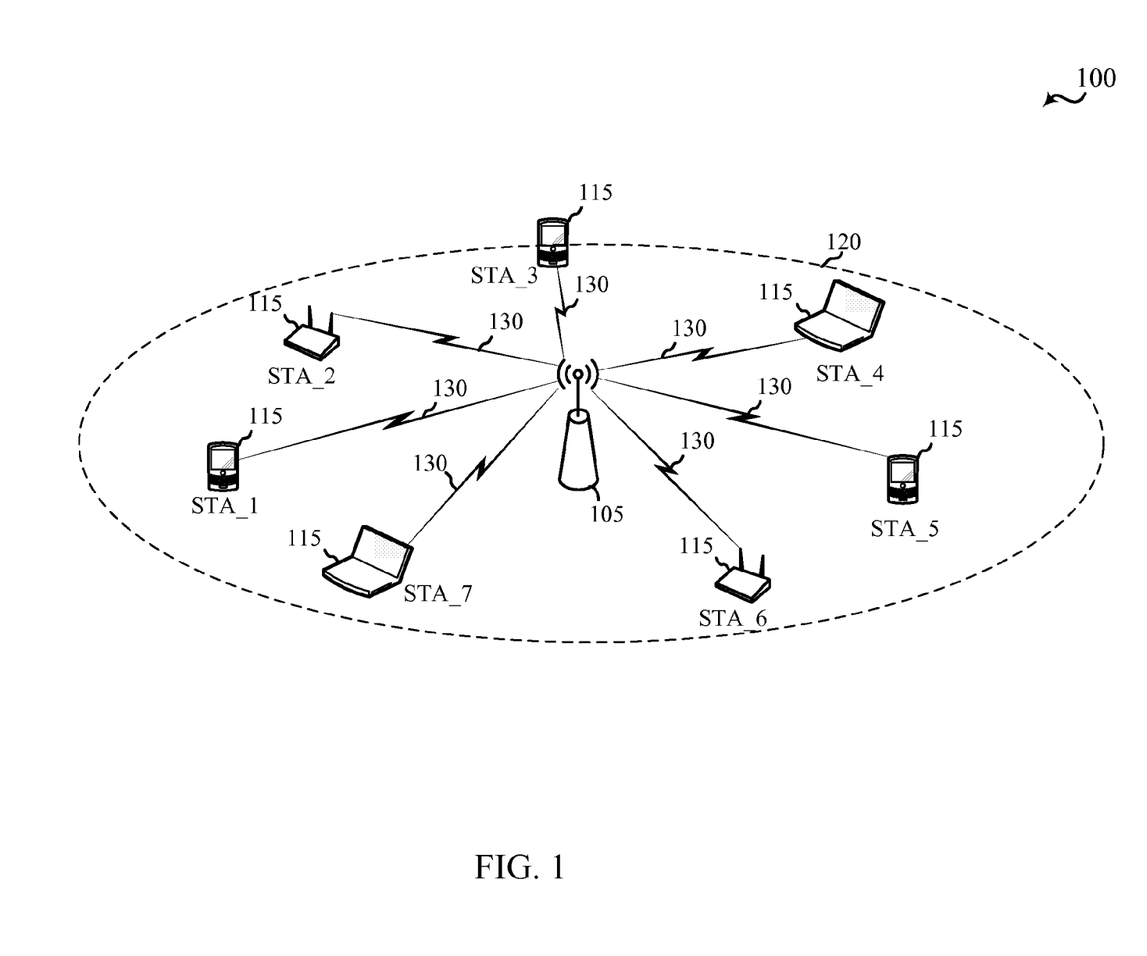
FIG. 1 illustrates an example of a wireless local area network (WLAN) that supports avoiding extended interframe space in accordance with various embodiments.

Referring first to FIG. 1, a WLAN 100 (also known as a Wi-Fi network) is shown that is configured to provide EIFS avoidance. The WLAN 100 includes an access point (AP) 105 and multiple associated stations 115. In this example, there are shown seven (7) stations 115 (STAs), which are identified as STA_1, STA_2, STA_3, STA_4, STA_5, STA_6, and STA_7. The WLAN 100, however, may have more or fewer stations 115 than those shown in FIG. 1 since the number shown is simply for illustrative purposes. The AP 105 and the associated stations 115 may represent a basic service set (BSS). The various stations 115 in the network are able to communicate with one another through the AP 105. Also shown is a coverage area 120 of the AP 105, which may represent a basic service area (BSA) of the WLAN 100. Although not shown in FIG. 1, an extended network base station associated with the WLAN 100 is typically connected to a wired or wireless distribution system (DS) that may allow multiple APs to be connected in an extended service set.

The AP 105 may be configured to communicate bi-directionally with each of the stations 115 using transmissions 130. The transmissions 130 may include downlink transmissions (e.g., beacon frames) that are sent from the AP 105 to a station 115 as well as uplink transmissions (e.g., acknowledgments or ACK frames) that are sent from a station 115 to the AP 105. Typically, the AP 105 is configured to broadcast its downlink transmissions to the stations 115 that are within the coverage area 120. Each station 115 may wait for a backoff period after another station or AP transmits in order to prevent the stations from interfering with each other during transmission. The backoff period may be selected randomly from a set of possible backoff periods, and the set may be based at least in part on a priority level of the station 115. If a transmission is received incorrectly by a station 115, that station may wait for an EIFS before beginning the backoff count. When a terminating message is sent at the end of a TXOP, a station 115 may begin the backoff count without waiting for the EIFS.

Figure 2:
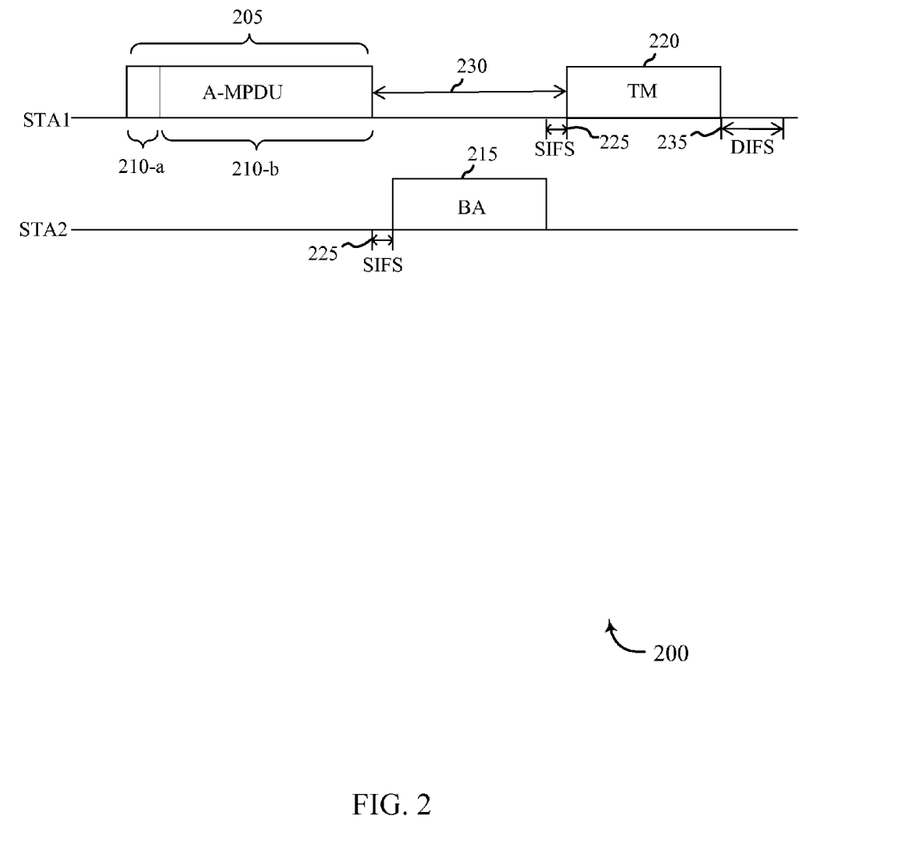
FIG. 2 illustrates an example of a system for avoiding extended interframe space in a WLAN in accordance with various embodiments.

FIG. 2 illustrates an example of transmissions within a wireless communication system 200 in accordance with various embodiments. The transmission timeline of a first wireless device is labeled as STA1, and the transmission timeline of a second wireless device is labeled STA2. While the present example refers to the wireless devices as stations, in various examples each of the timelines may represent the transmissions of a station 115 or an access point 105 with reference to FIG. 1. A first message 205 is transmitted by STA1. The first message 205 may be a frame. The first message 205 may comprise a first and second portion, which may be sent at the same or different data rates. In the example of FIG. 2, the first message may be an aggregated MPDU (A-MPDU), comprising a preamble 210-a transmitted at a first data rate and a number of MPDUs 210-b transmitted at a second data rate higher than the first. For example, the preamble 210-a may be transmitted at 6 Mbps and the MPDUs 210-b may be transmitted at 24 Mbps, although other data rates are possible.

A second message 215 may be transmitted by STA2. As shown in FIG. 2, the second message 215 may be a block acknowledgement (BA) or another type of ACK indicating whether the messages sent by STA1 have been correctly received. Alternatively, the second message 215 may be another type of message. In the case that the second message is a BA or an ACK, no further acknowledgement messages from STA1 are expected. The second message 215 may be a frame. The second message 215 may comprise a first and second portion, which may be sent at the same or different data rates. The data rates at which the first and second portion are sent may be the same as or different than the data rates of the first message 205. For example, the second portion of the second message 215 may be sent at a data rate that is higher than the data rate of the first portion of the first message 205 and the first portion of the second message 215. This may occur when the data rate of the second portion of the first message 205 is higher than the data rate of the first portion of the first message 205. For example, the first portion of the first message 205 may be transmitted at 6 Mbps and the second portion of the first message 205 at 300 Mbps. The first portion of the second message 215 may then be transmitted at 6 Mbps and the second portion of the second message 215 may be sent at a rate of 24 Mbps. The second portions of the first and second messages 205, 215 will in this example cause an EIFS to be started in at least part of the network.

A terminating message 220 may be transmitted by STA1. The terminating message 220 may be a frame. The terminating message 220 may also comprise a first portion and a second portion. The first and second portions may be transmitted with the same or different data rates, which may be the same as the first data rate of the first message 205. The terminating message 220 may indicate that the TXOP for STA1 and STA2 is at an end. Alternatively, the terminating message 220 may indicate that no further ACK will be sent by STA1 or STA2. Other stations 115 (not shown) may receive the terminating message 220 and may begin a backoff count without waiting for the EIFS period because the terminating message 220 (including both the first and second portion thereof, if applicable) may be transmitted at the first (lower) data rate such as the first data rate. For example, the terminating message 220 may be sent at the same rate as the header of the first message (e.g., 6 Mbps). The terminating message 220 may include an ACK message or a clear-to-send (CTS) message. In other examples, any short frame may be used.

A short interframe space (SIFS) 225 may exist between each of the transmissions. For example, the SIFS may last 16 microseconds (μs). Thus, there may be a delay 230 between the first message and the terminating message 220 that consists of the duration of the second message 215 and two SIFS periods. After the terminating message 220, various stations may begin a contention based access procedure during a distributed coordination function interframe space (DIFS) 235.

Figure 3:
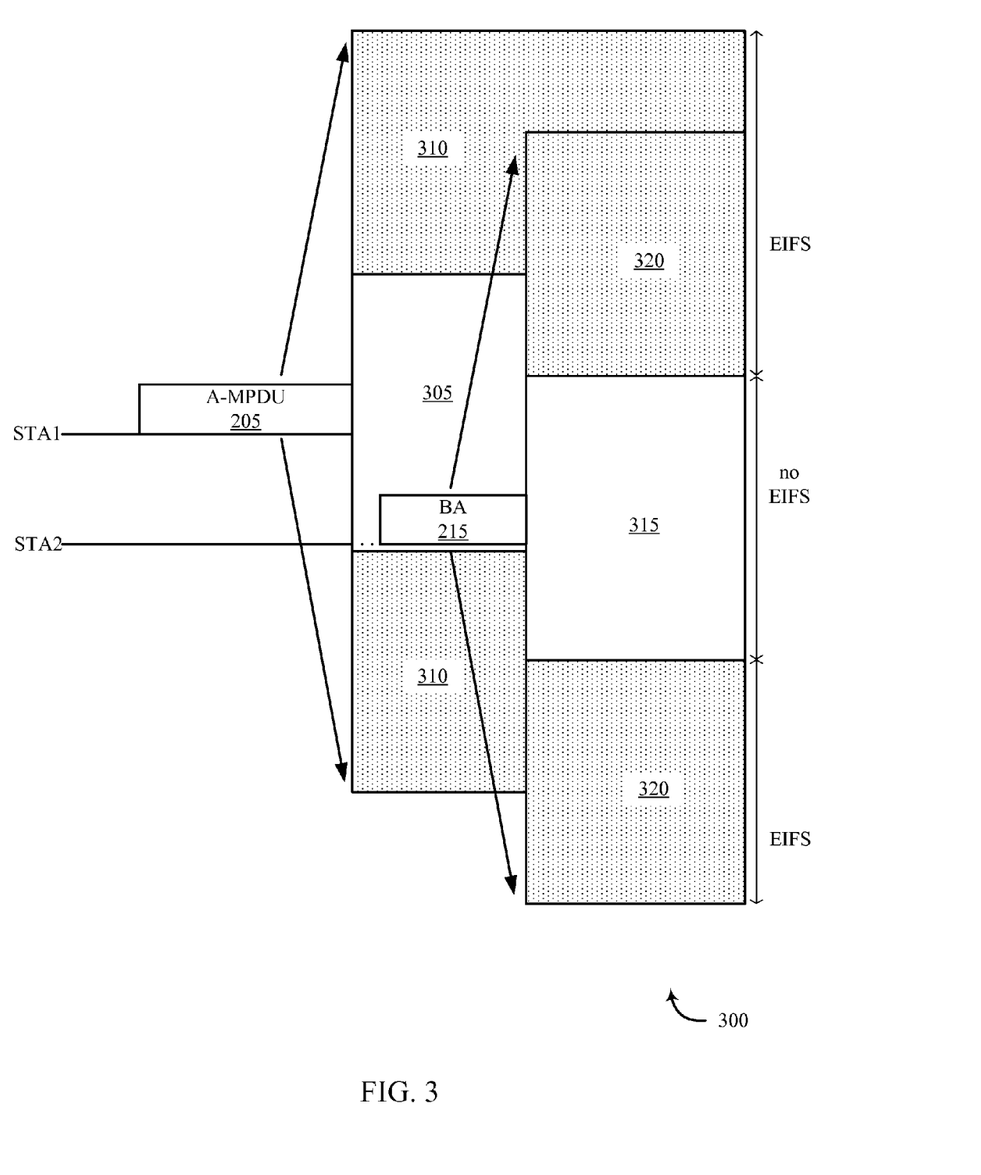
FIG. 3 illustrates an example of WLAN communications during a transmit opportunity in accordance with various embodiments.

FIG. 3 illustrates an example of transmissions within a wireless communication system 300 during a transmission opportunity. The transmission timeline of a first wireless device is labeled as STA1, and the transmission timeline of a second wireless device is labeled STA2. A first message 205 is transmitted by STA1. A second message 215 may be transmitted by STA2. An SIFS 225 may exist between the transmissions (not shown). The first message 205 and the second message 215 may be examples of the corresponding parts of FIG. 2.

As discussed above with reference to FIG. 2, a first portion (i.e., 210-a of FIG. 2) of the first message 205 may be transmitted at a first rate and a second portion (i.e., 210-b of FIG. 2) may be transmitted at a second rate that is higher than the first rate. The vertical side of a first range 305 represents the range of locations that may correctly receive data transmitted at the first data rate or the second data rate of the first message 205. The vertical side of a second range 310 represents the range of locations that may correctly receive data transmitted at the first data rate of the first message 205, but not the second data rate. FIG. 3 illustrates the example where the first range 305 is a subset of the second range 310 because the message uses two different data rates. For example, a first portion of the first message 205 transmitted at 6 Mbps may have a greater range than a second portion of the second message 215 transmitted at 24 Mbps. Some stations 115 (not shown) may be located in a part of the second range 310 that does not overlap with the first range 305. Thus, these stations 115 may be able to correctly receive part, but not all of the first message 205. For example, a station 115 may be able to correctly receive the preamble of an A-MPDU, but not be able to correctly receive the aggregated MPDUs within the body of the message.

The vertical side of a third range 315 represents the range of locations that may correctly receive a portion of the second frame 215 transmitted at a first data rate of the second message 215. The vertical side of a fourth range 320 represents the range of locations that may correctly receive a portion of the second frame 215 transmitted at a second data rate of the second message 215. The first data rate of the second message 215 may be a third data rate. The third data rate may be the same as the first data rate of the first message 205, or it may be different. The second data rate of the second message 215 may be a fourth data rate. The fourth data rate may be the same as or different from the second data rate of the first message 205. In some embodiments (not shown) there may not be a second message 215, and in some cases the second message 215 may only have a single data rate.

On the right side of the diagram of the wireless communication system 300 are labels indicating whether a station 115 within the indicated range would wait for an EIFS period during the illustrated TXOP. Any station 115 that can correctly receive the final frames of the first message 205 and the second message 215 (if it exists) will not wait for the EIFS period before beginning the backoff counter. A station that receives some portion of a message, but cannot receive one or more frames at the end of a last message may wait for the EIFS even if no further acknowledgement is forthcoming. For example, a station 115 that can receive a 6 Mbps preamble sent by STA1, but cannot correctly receive a 24 Mbps BA sent by STA2 may wait for the EIFS even though STA1 may not send an ACK for the BA.

Figure 4:
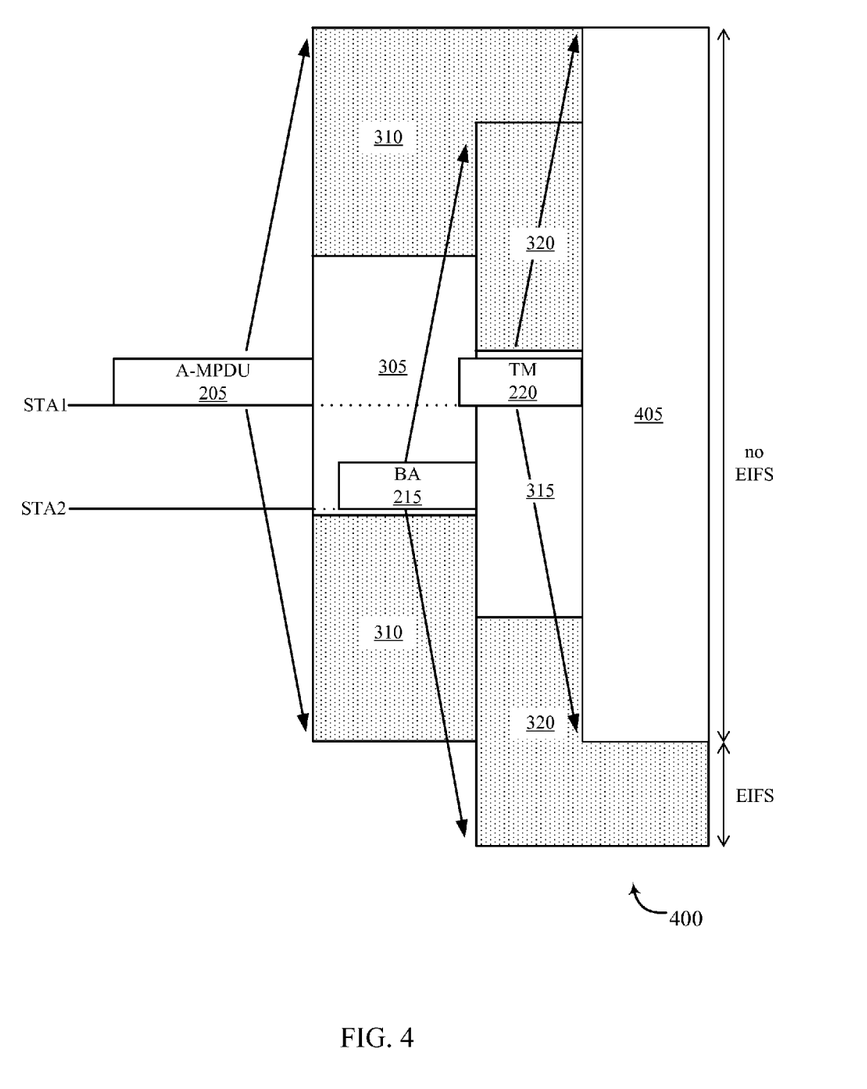
FIG. 4 illustrates an example of WLAN communications during a transmit opportunity in accordance with various embodiments.

FIG. 4 illustrates an example of transmissions within a wireless communication system 400 for avoiding extended interframe space with a terminating message in accordance with various embodiments. The transmission timeline of a first wireless device is labeled as STA1, and the transmission timeline of a second wireless device is labeled STA2. A first message 205 is transmitted by STA1. A second message 215 may be transmitted by STA2. A terminating message 220 may also be sent by STA1. An SIFS 225 may exist between the transmissions (not shown). The vertical side of a first range 305 represents the range of locations that may correctly receive a frame transmitted at the first data rate of the first message 205. The vertical side of a second range 310 represents the range of locations that may correctly receive a frame transmitted at the second data rate of the first message 205. The vertical side of a third range 315 represents the range of locations that may correctly receive a frame transmitted at the first data rate of the second message 215. The vertical side of a fourth range 320 represents the range of locations that may correctly receive a frame transmitted at the second data rate of the second message 215.

Figure 5:
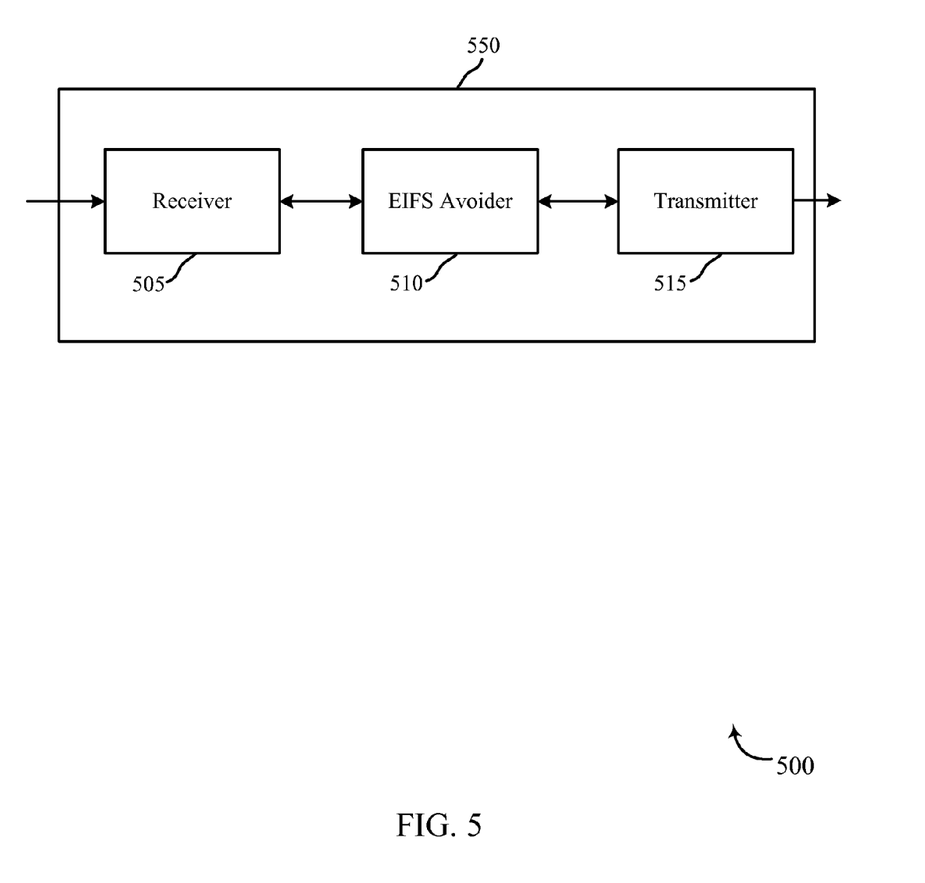
FIG. 5 shows a block diagram of a device for avoiding extended interframe space in a WLAN in accordance with various embodiments.

FIG. 5 shows a block diagram 500 of a wireless device 550 for avoiding EIFS in a WLAN in accordance with various embodiments. The wireless device 550 may be an example of a station 115 or an AP 105 described with reference to FIGS. 1-4. The wireless device 550 may include a receiver 505, an EIFS avoider 510, or a transmitter 515. The wireless device 550 may also include a processor. Each of these components may be in communication with each other.

The first message 205, the second message 215, the terminating message 220, the first range 305, the second range 310, the third range 315, and the fourth range 320 may be examples of the corresponding parts of FIG. 2 or 3. As in FIG. 3, there may be no second message 215 sent by STA2, and the second message 215 may or may not consist of parts transmitted at different data rates.

The vertical side of a fifth range 405 represents the range of locations that may correctly receive the terminating message. Because the terminating message may be sent at a lower data rate than one or more frames from the first message 205 or the second message 215, the fifth range 405 may extend beyond the first range 305, the second range 310, the third range 315, or the fourth range 320 in one or more directions. In the case depicted, the fifth range 405 may be co-extensive with the first range 305 because the terminating message 220 may be sent from the same location and at the same data rate as a portion of the first message 205 sent at the lower data rate. For example, the preamble of the A-MPDU sent by STA1 may be sent at 6 Mbps, the MPDU itself may be sent at 24 Mbps, a BA sent by STA2 may also be sent at 24 Mbps, and the terminating message (including the second portion thereof, if applicable) may be sent at 6 Mbps. Some stations 115 (not shown) may be able to receive the terminating message even though they cannot correctly receive the MPDU sent with the first message 205 or the BA sent as the second message 215. A station in this situation may avoid waiting for the EIFS period due to successful reception of the terminating message 220, whereas without the terminating message they may wait for the EIFS (as depicted in FIG. 3).

On the side of the diagram of the wireless communication system 400 are labels indicating whether a station 115 within the indicated range would wait for an EIFS period. Any station that can correctly receive all portions of the first message 205 and the second message 215 (if it exists) will not wait the EIFS period. A station that receives some portion of a message, but cannot receive one or more frames at the end of last message may wait for the EIFS even if no further acknowledgement is forthcoming. For example, a station 115 that can receive a 6 Mbps preamble sent by STA1, but cannot correctly receive a 24 Mbps BA sent by STA2 may wait for the EIFS even though STA1 may not send an ACK for the BA.

The components of the wireless device 550 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. Other types of integrated circuits may also be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 505 may receive information such as packets, user data, or control information associated with various information channels (e.g., control channels, data channels, etc.). The receiver may be configured to receive a message prior to transmitting a terminating message. Information may be passed on to the EIFS avoider 510, and to other components of the wireless device 550.

In coordination with the transmitter 515, the EIFS avoider 510 may transmit a first message during a TXOP. The first message may comprise a first portion transmitted at a first data rate and a second portion transmitted at a second data rate that is higher than the first data rate. The EIFS avoider 510 may then transmit a terminating message at the first data rate. Stations 115 that receive the terminating message may begin a backoff count rather than waiting for an EIFS.

The transmitter 515 may transmit the one or more signals received from other components of the wireless device. The transmitter 515 may be collocated with the receiver 505 in a transceiver. The transmitter 515 may include one or more antennas.

Figure 6:
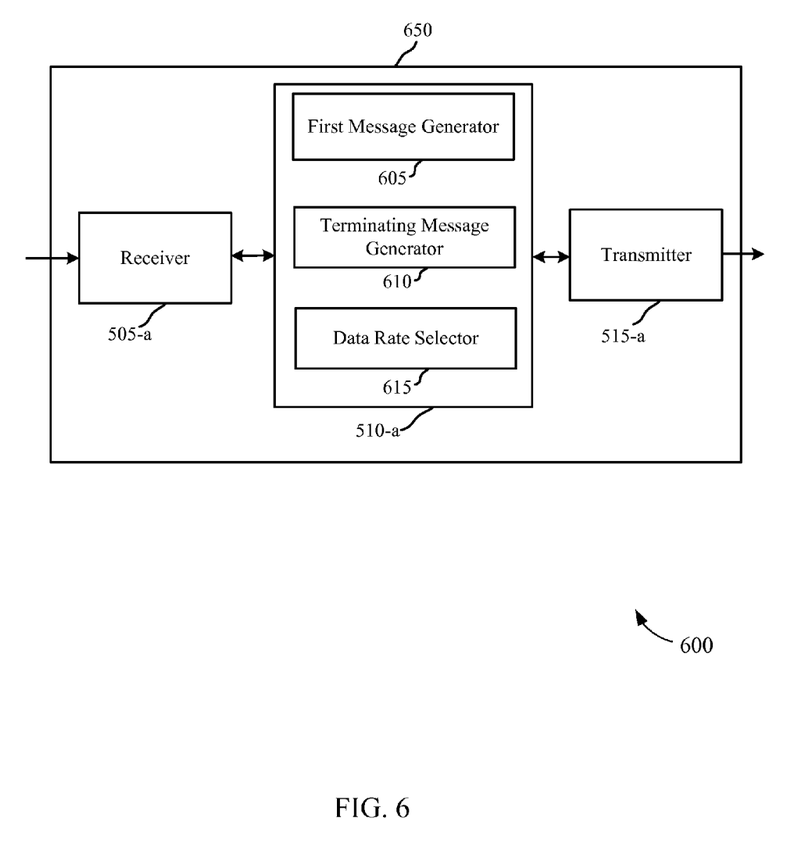
FIG. 6 shows a block diagram of a device for avoiding extended interframe space in a WLAN in accordance with various embodiments.

FIG. 6 shows a block diagram 600 of a wireless device 650 for avoiding EIFS in a WLAN in accordance with various embodiments. The wireless device 650 may be an example of a station 115, an AP 105 or a wireless device 550 described with reference to FIGS. 1-5. The wireless device 650 may include a receiver 505-*a*, an EIFS avoider 510-*a*, or a transmitter 515-*a*. The wireless device 650 may also include a processor. Each of these components may be in communication with each other. The EIFS avoider 510-*a* may also include a first message generator 605, a terminating message generator 610, and a data rate selector 615.

The components of the wireless device may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. Other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 505-*a* may receive information which may be passed on to the EIFS avoider 510-*a*, and to other components of the wireless device. The EIFS avoider 510-*a* may be configured to perform the operations described above with reference to FIG. 5. The transmitter 515-*a* may transmit the one or more messages received from other components of the wireless device 650.

The first message generator 605 may be configured to transmit a first message during a TXOP. The first message may comprise a first portion transmitted at a first data rate and a second portion transmitted at a second data rate that is higher than the first data rate. The first message may be an A-MPDU, comprising a preamble transmitted at a first data rate and an MPDU transmitted at a second data rate higher than the first. For example, the preamble may be transmitted at 6 Mbps and the MPDU may be transmitted at 24 Mbps, although other data rates are possible.

The terminating message generator 610 may be configured to transmit a terminating message at the first data rate. The terminating message may be a CTS message. Alternatively, the terminating message may include an acknowledgement ACK message. The terminating message may indicate that no further ACK will be sent. The terminating message may be an indicator to other stations 115 that they may begin a backoff count without waiting for the EIFS period. The terminating message may be sent at a low data rate, such as the first data rate. For example, the terminating message may be sent at 6 Mbps.

The data rate selector 615 may be configured to select a data rate for transmission in coordination with the first message generator 605 and the terminating message generator 610. For example, the data rate selector 615 may determine that a preamble of the first message will be sent at a low data rate such a 6 Mbps, and another part of the first message will be sent at a higher data rate such as 24 Mbps. The data rate selector 615 may then determine that the terminating message may be transmitted at the lower data rate.

The receiver 505-*a* may be configured to receive a second message prior to transmitting the terminating message. The receiver 505-*a* may be configured to receive the second message comprising a third portion transmitted at the first data rate and a fourth portion transmitted at a third data rate that is higher than the first data rate.

Figure 7:
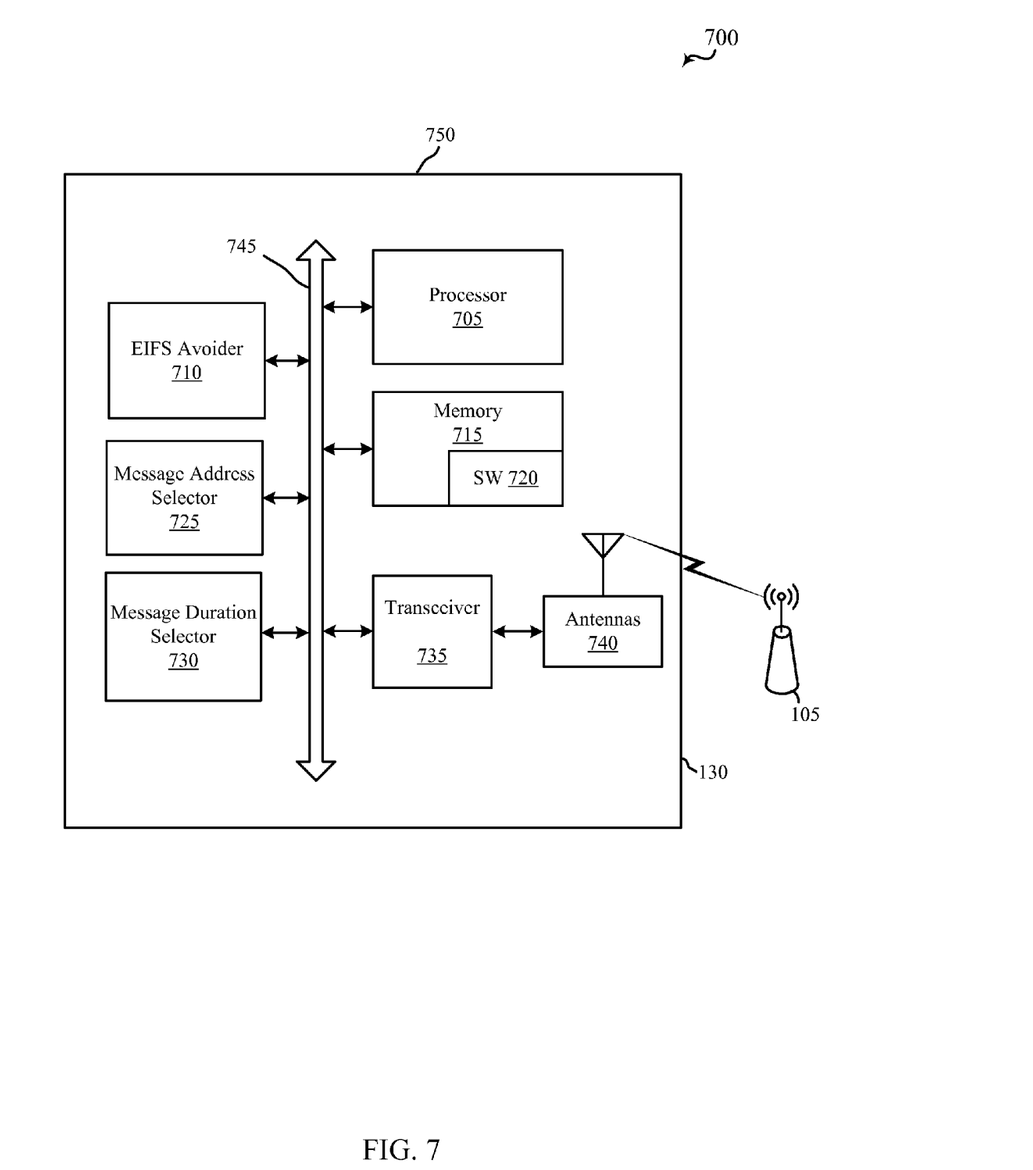
FIG. 7 illustrates a block diagram of a system for avoiding extended interframe space in a WLAN in accordance with various embodiments.

FIG. 7 shows a diagram of a WLAN 700 in accordance with various embodiments. The WLAN 700 may include a wireless device 750, which may be an example of one of the stations 115 described with reference to FIGS. 1-5, communicatively coupled with an access point 105, which may be an example of one of the access points 105 described with reference to FIGS. 1-5. The wireless device 750 may also be an access point 105. The wireless device 750 may generally include components for bi-directional voice and data communications including components for transmitting communications and components for receiving communications.

The wireless device 750 may include antenna(s) 740, a transceiver 735, a processor 705, and memory 715 (including software (SW)) 720, which each may communicate, directly or indirectly, with each other (e.g., via one or more buses 745. The transceiver 735 may be configured to communicate bi-directionally, via the antenna(s) 740 or one or more wired or wireless links, with one or more networks, as described above. For example, the transceiver 735 may be configured to communicate bi-directionally with an access point 105. The transceiver 735 may include a modem configured to modulate the packets and provide the modulated packets to the antenna(s) 740 for transmission, and to demodulate packets received from the antenna(s) 740. While the wireless device 750 may include a single antenna 740, the wireless device 750 may also have multiple antennas 740 capable of concurrently transmitting or receiving multiple wireless transmissions. The transceiver 735 may also be capable of concurrently communicating with one or more APs 105.

The memory 715 may include random access memory (RAM) and read-only memory (ROM). The memory 715 may store computer-readable, computer-executable software/firmware code 720 containing instructions that are configured to, when executed, cause the processor 705 to perform various functions described herein (e.g., call processing, database management, processing of carrier mode indicators, reporting CSI, etc.). Alternatively, the computer-executable software/firmware code 720 may not be directly executable by the processor 705 but may be configured to cause a computer (e.g., when compiled and executed) to perform functions described herein. The processor 705 may include an intelligent hardware device, e.g., a central processing unit (CPU), a microcontroller, an application-specific integrated circuit (ASIC), etc. may include random access memory (RAM) and read-only memory (ROM). The memory 715 may store computer-readable, computer-executable software/firmware code 720 containing instructions that are configured to, when executed, cause the processor 705 to perform various functions described herein (e.g., call processing, database management, processing of carrier mode indicators, reporting CSI, etc.). Alternatively, the computer-executable software/firmware code 720 may not be directly executable by the processor 705 but be configured to cause a computer (e.g., when compiled and executed) to perform functions described herein. The processor 705 may include an intelligent hardware device, e.g., a central processing unit (CPU), a microcontroller, an application-specific integrated circuit (ASIC), etc.

The wireless device 750 may also include an EIFS avoider 710 that may be configured to perform the functions of the EIFS avoider 510 with reference to FIGS. 5 and 6. The wireless device 750 may also include a message address selector 725, which may be configured to address the first message and the terminating message in coordination with the EIFS avoider 710. The message address selector 725 may be configured to address the terminating message to a transmitter of the terminating message. Alternatively, the message address selector 725 may be configured to address the terminating message to a latest recipient of the transmit opportunity. Furthermore, the message address selector 725 may be configured to address the terminating message to a group address. The message address selector 725 may also be configured to address the terminating message to a random address.

The wireless device 750 may also include a message duration selector 730, which may be configured to indicate a duration extending to the end of the terminating message in a duration field of the first message. The duration of the terminating message may include an SIFS. It will be understood that any or all of the EIFS avoider 710, the message address selector 725, and the message duration selector 730 may be embodied in the computer-executable software/firmware code 720. Alternatively, any or all of these components may be implemented as separate or combined/integrated hardware components.

Figure 8:
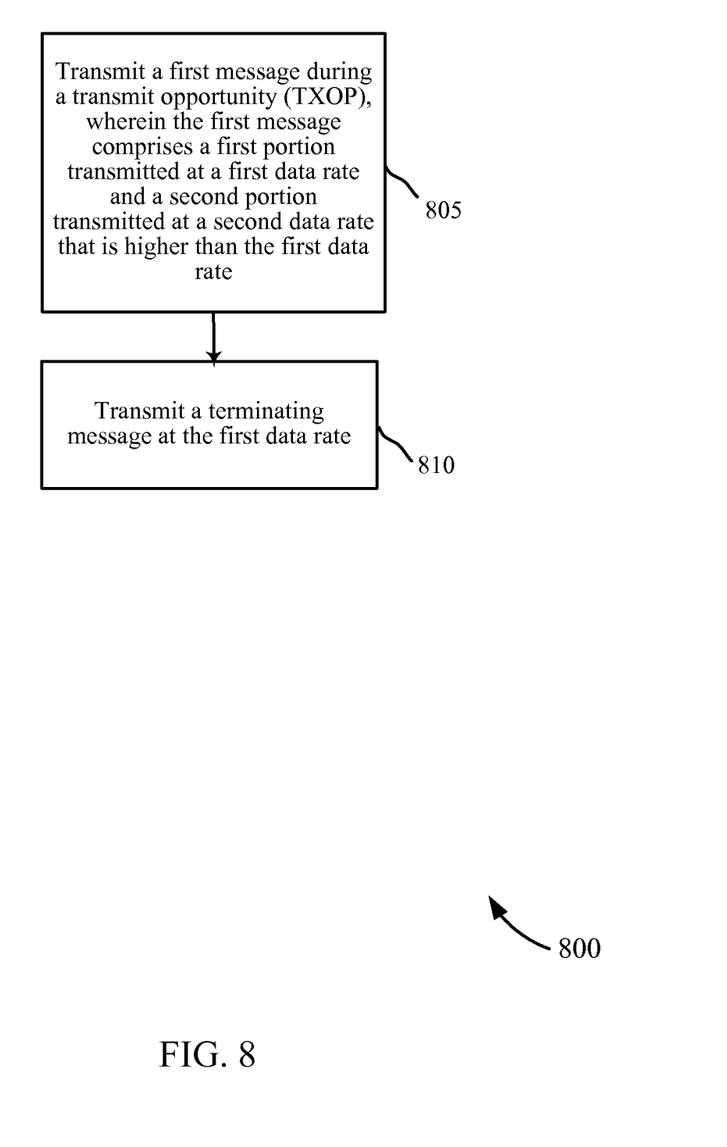
FIG. 8 shows a flowchart illustrating a method for avoiding extended interframe space in a WLAN in accordance with various embodiments.

FIG. 8 shows a flowchart 800 illustrating a method for avoiding EIFS in a WLAN in accordance with various embodiments. The functions of flowchart 800 may be implemented by a wireless device or its components such as a station 115, AP 105, or wireless device 550, 650, or 750 as described with reference to FIGS. 1-7. The blocks of the flowchart 800 may be performed by an EIFS avoider 510 with reference to FIGS. 5-7.

At block 805, a wireless device may transmit a first message during a TXOP, wherein the first message comprises a first portion transmitted at a first data rate and a second portion transmitted at a second data rate that is higher than the first data rate. The functions of block 805 may be performed by the first message generator 605 in coordination with the data rate selector 615 or the transmitter 515-a as described above with reference to FIG. 6.

At block 810, the wireless device may transmit a terminating message at the first data rate. The terminating message may indicate that the TXOP for a wireless device at an end. Alternatively, the terminating message may indicate that no further ACK will be sent by a wireless station. The terminating message may be an indicator to other stations 115 that they may begin a backoff count without waiting for the EIFS period. The terminating message may be sent at a low data rate, such as the first data rate. For example, the terminating message may be sent at 6 Mbps. The terminating message may also comprise an ACK message or a CTS message. The functions of block 810 may be performed by the terminating message generator 610 in coordination with the data rate selector 615 or the transmitter 515-a as described above with reference to FIG. 6.

It should be noted that the method of flowchart 800 is just one implementation and that the operations of the method, and the steps may be rearranged or otherwise modified such that other implementations are possible.

Figure 9:
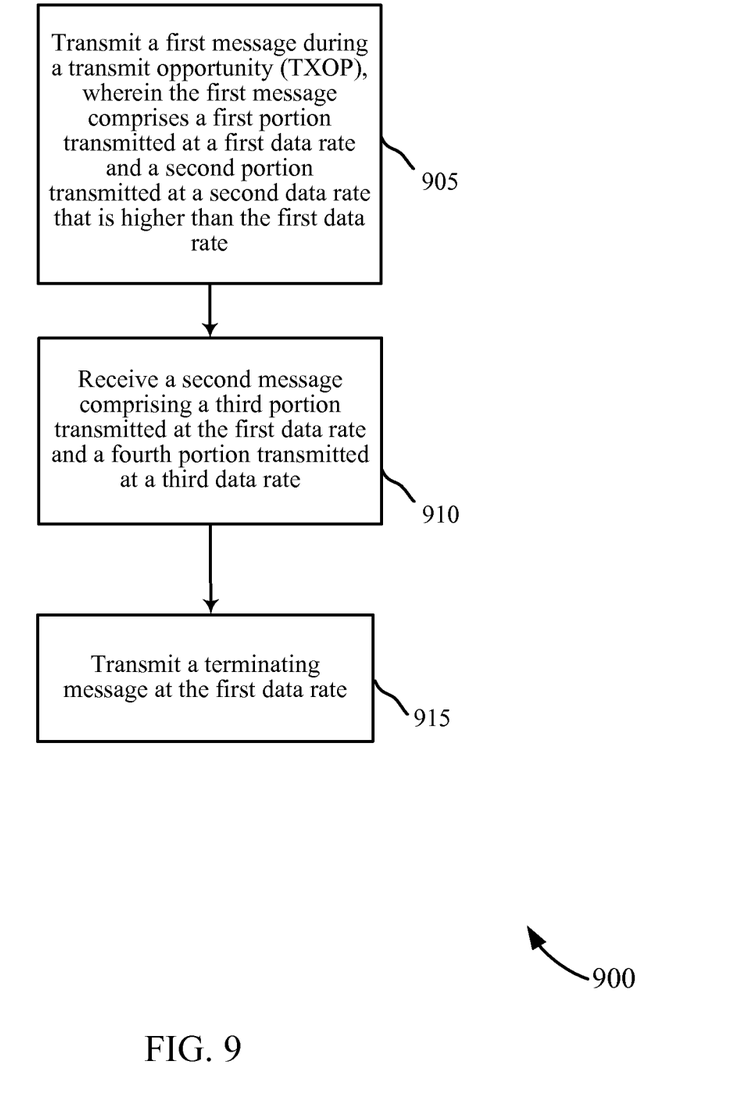
FIG. 9 shows a flowchart illustrating a method for avoiding extended interframe space in a WLAN in accordance with various embodiments.

FIG. 9 shows a flowchart 900 illustrating a method for avoiding EIFS in a WLAN in accordance with various embodiments. The functions of flowchart 900 may be implemented by a wireless device or its components such as a station 115, an AP 105, or a wireless device 550, 650, or 750 as described with reference to FIGS. 1-7. The blocks of the flowchart 900 may be performed by an EIFS avoider 510 with reference to FIGS. 5-7.

At block 905, a wireless device may transmit a first message during a TXOP, wherein the first message comprises a first portion transmitted at a first data rate and a second portion transmitted at a second data rate that is higher than the first data rate. The functions of block 805 may be performed by the first message generator 605 in coordination with the data rate selector 615 or the transmitter 515-a as described above with reference to FIG. 6.

At block 910, the wireless device may receive a second message comprising a third portion transmitted at the first data rate and a fourth portion transmitted at a third data rate. The second message may be an A-MPDU, or the second message may be a BA or another type of ACK indicating whether one or more other messages have been correctly received. In some cases, such as in the case that the second message is a BA or an ACK, no further acknowledgement messages are expected. At least part of the second message may be sent at a higher data rate than the data rate of some portion of the first message. For example, it may be sent at a rate of 24 Mbps. The functions of block 910 may be performed by the receiver 505 as described above with reference to FIG. 5-6.

At block 915, the wireless device may transmit a terminating message at the first data rate. The functions of block 915 may be performed by the terminating message generator 610 in coordination with the data rate selector 615 or the transmitter 515-a as described above with reference to FIG. 6. It should be noted that the method of flowchart 900 is just one implementation and that the operations of the method, and the steps may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. Well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication comprising:
   transmitting a first message at a beginning of a transmit opportunity (TXOP), wherein the first message indicates a fixed transmission duration within the TXOP and comprises a first portion transmitted at a first data rate and a second portion transmitted at a second data rate that is higher than the first data rate; and
   transmitting a terminating message at the first data rate, wherein the terminating message comprises a clear-to-send (CTS) message or an acknowledgement (ACK) message.

2. The method of claim 1, further comprising:
   receiving a second message prior to transmitting the terminating message.

3. The method of claim 2, wherein the second message comprises a third portion transmitted at the first data rate and a fourth portion transmitted at a third data rate that is higher than the first data rate.

4. The method of claim 1, further comprising:
   addressing the terminating message to a transmitter of the terminating message.

5. The method of claim 1, further comprising:
   addressing the terminating message to a latest recipient of the transmit opportunity.

6. The method of claim 1, further comprising:
   addressing the terminating message to a group address.

7. The method of claim 1, further comprising:
   addressing the terminating message to a random address.

8. The method of claim 1, wherein the first message comprises an aggregate media access control packet data unit (A-MPDU), the first portion comprises a preamble of the A-MPDU, and the second portion comprises an MPDU of the A-MPDU.

9. The method of claim 1, wherein the terminating message comprises a first portion of the terminating message and a second portion of the terminating message;
   and wherein the first portion of the terminating message and the second portion of the terminating message are transmitted at the same data rate.

10. An apparatus for wireless communication comprising:
    means for transmitting a first message at a beginning of a transmit opportunity (TXOP), wherein the first message indicates a fixed transmission duration within the TXOP and comprises a first portion transmitted at a first data rate and a second portion transmitted at a second data rate that is higher than the first data rate; and
    means for transmitting a terminating message at the first data rate, wherein the terminating message comprises a clear-to-send (CTS) message or an acknowledgement (ACK) message.

11. The apparatus of claim 10, further comprising:
    means for receiving a second message prior to transmitting the terminating message.

12. The apparatus of claim 11, wherein the second message comprises a third portion transmitted at the first data rate and a fourth portion transmitted at a third data rate that is higher than the first data rate.

13. The apparatus of claim 10, further comprising:
    means for addressing the terminating message to a transmitter of the terminating message.

14. The apparatus of claim 10, further comprising:
    means for addressing the terminating message to a latest recipient of the transmit opportunity.

15. An apparatus for wireless communication comprising:
    a transmitter to transmit a first message at a beginning of a transmit opportunity (TXOP), wherein the first message indicates a fixed transmission duration within the TXOP and comprises a first portion transmitted at a first data rate and a second portion transmitted at a second data rate that is higher than the first data rate, and transmit a terminating message at the first data rate, wherein the terminating message comprises a clear-to-send (CTS) message or an acknowledgement (ACK) message.

16. The apparatus of claim 15, further comprising:
    a receiver to receive a second message prior to transmitting the terminating message.

17. The apparatus of claim 16, wherein the second message comprises a third portion transmitted at the first data rate and a fourth portion transmitted at a third data rate that is higher than the first data rate.

18. A non-transitory computer-readable medium storing instructions executable by a processor to cause at least one device to:
    transmit a first message at a beginning of a transmit opportunity (TXOP), wherein the first message indicates a fixed transmission duration within the TXOP and comprises a first portion transmitted at a first data rate and a second portion transmitted at a second data rate that is higher than the first data rate; and transmit a terminating message at the first data rate, wherein the terminating message comprises a clear-to-send (CTS) message or an acknowledgement (ACK) message.

19. The non-transitory computer-readable medium of claim 18, wherein the instructions are further executable by the processor to cause the at least one device to:
receive a second message prior to transmitting the terminating message.

20. The non-transitory computer-readable medium of claim 19, wherein the second message comprises a third portion transmitted at the first data rate and a fourth portion transmitted at a third data rate that is higher than the first data rate.

* * * * *